(12) United States Patent
Tiilikainen et al.

(10) Patent No.: US 9,573,421 B2
(45) Date of Patent: Feb. 21, 2017

(54) FASTENER AND DOLLY

(71) Applicant: K. Hartwall Oy Ab, Söderkulla (FI)

(72) Inventors: Markku Tiilikainen, Söderkulla (FI); Jack Grönholm, Söderkulla (FI)

(73) Assignee: K. Hartwall Oy Ab, Soderkulla (FI)

( * ) Notice: Subject to any disclaimer, the term of this patent is extended or adjusted under 35 U.S.C. 154(b) by 4 days.

(21) Appl. No.: 14/133,322

(22) Filed: Dec. 18, 2013

(65) Prior Publication Data
US 2014/0175765 A1 Jun. 26, 2014

(30) Foreign Application Priority Data
Dec. 21, 2012 (FI) .................................. 20126362

(51) Int. Cl.
*B62B 3/16* (2006.01)
*B60B 33/00* (2006.01)
*B62B 3/00* (2006.01)
*B62B 3/14* (2006.01)

(52) U.S. Cl.
CPC ....... *B60B 33/0005* (2013.01); *B60B 33/0018* (2013.01); *B62B 3/00* (2013.01); *B62B 3/16* (2013.01); *B60B 33/0028* (2013.01); *B60B 33/0044* (2013.01); *B60B 33/0049* (2013.01); *B60B 33/0068* (2013.01); *B60B 33/0073* (2013.01); *B60B 33/0081* (2013.01); *B60B 2900/113* (2013.01); *B60B 2900/115* (2013.01); *B62B 3/1476* (2013.01); *B62B 2301/04* (2013.01); *B62B 2301/044* (2013.01); *B62B 2301/05* (2013.01)

(58) Field of Classification Search
CPC .................................. B62B 3/16; B62B 5/0466
USPC ........................... 280/33.998, 79.11; 16/35 R
See application file for complete search history.

(56) References Cited

U.S. PATENT DOCUMENTS

| | | | | | |
|---|---|---|---|---|---|
| 3,523,694 | A | * | 8/1970 | Oliver | 280/33.998 |
| 5,331,717 | A | * | 7/1994 | Joslin | B60B 33/028 16/35 R |
| 5,445,396 | A | * | 8/1995 | Sebor | 280/33.998 |
| 5,711,540 | A | * | 1/1998 | Nesting | 280/33.998 |
| 5,745,951 | A | * | 5/1998 | Waner | B60B 33/0007 16/31 R |
| 5,823,549 | A | * | 10/1998 | Morgan, Jr. | 280/33.998 |
| 5,876,049 | A | * | 3/1999 | Spear et al. | 280/47.371 |

(Continued)

FOREIGN PATENT DOCUMENTS

| | | |
|---|---|---|
| DE | 102007049613 A1 | 4/2009 |
| EP | 0675829 | 10/1995 |

(Continued)

OTHER PUBLICATIONS

Finnish Search Report, Finnish Patent App. No. 20126362, mailed Oct. 23, 2013, K. Hartwall Oy Ab, 1 pg.

(Continued)

*Primary Examiner* — Jeffrey K Restifo
(74) *Attorney, Agent, or Firm* — Chernoff, Vilhauer, McClung & Stenzel LLP

(57) ABSTRACT

A dolly comprising a chassis, a castor having a fork and a wheel rotatably mounted to the fork, and a fastener for fixing the fork of the castor to the chassis of the dolly. The fastener comprises a head which is shaped to the peripheral shape of the wheel of the castor.

2 Claims, 6 Drawing Sheets

(56) References Cited

U.S. PATENT DOCUMENTS

| | | | |
|---|---|---|---|
| 6,161,849 A * | 12/2000 | Schweninger | B60B 33/021 16/18 R |
| 6,257,152 B1 * | 7/2001 | Liu | 108/53.3 |
| 6,349,951 B1 * | 2/2002 | Mogensen et al. | 280/33.998 |
| 6,979,005 B1 * | 12/2005 | McLerran | 280/33.998 |
| 8,029,006 B2 * | 10/2011 | Kalajyan | 280/33.998 |
| 8,220,613 B2 * | 7/2012 | Dehne et al. | 198/346.2 |
| 8,740,228 B2 * | 6/2014 | Patterson et al. | 280/33.998 |
| 2012/0049472 A1 * | 3/2012 | Patterson et al. | 280/33.998 |
| 2014/0175765 A1 * | 6/2014 | Tiilikainen et al. | 280/79.11 |

FOREIGN PATENT DOCUMENTS

| | | |
|---|---|---|
| EP | 1820714 A2 | 8/2007 |
| JP | 2006051860 | 2/2006 |
| WO | 9842585 A1 | 10/1998 |
| WO | 0051898 A1 | 9/2000 |

OTHER PUBLICATIONS

European Search Report for Application No. EP 13 19 8113, date of completion of the search Apr. 1, 2014, 1 pg.
Finnish Patent and Registration Office; Search Report 2 issued in application No. 20126362; Aug. 7, 2015; 2 pages; Finnish Patent and Registration Office; Helsinki, Finland.
E-bay: 93097 Camaro Hood Bumper Stop Rubber Pair; Screenshots [online]; retrieved from the Internet <URL: http//www.ebay.com/itm/93-97-Camaro-RS-SS-Z28-Firebird-Trans-Am-Hood-Bump-Bumper-Stop-Rubber-Pair-/181682293036>; figures 1-2.

* cited by examiner

US 9,573,421 B2

FASTENER AND DOLLY

CROSS-REFERENCE TO RELATED APPLICATIONS

This application claims priority under 35 U.S.C. §119 to Finnish Patent Application No. 20126362, filed Dec. 21, 2012.

BACKGROUND OF THE INVENTION

The present invention relates to logistics equipment. In particular, the invention relates to dollies. More specifically, the invention relates to a fastener and dolly according to the preamble portions of the independent claims.

There is known a vast variety of different devices used for transporting parceled goods. Typically pieces or stacks thereof are loaded onto a wheeled platform, on which they are conveyed to shop floor or storage. These wheeled platforms are called dollies. Traditional dollies feature a rectangular chassis welded together from tubes having a rectangular profile. Fixed castors are secured to one end of the dolly by means of bolts or riveted joints. Each castor is typically fixed with four bolts. Fixed castors are such that the wheel of the castor is permanently aligned with one side of the dolly. At the opposite end of the dolly, castor wheels are provided with a similar bolt or riveted joint. Due to the articulated construction, the castor wheels may turn about an axis which is orthogonal to the axis of revolution of the wheel, i.e. about the vertical axis.

The top face of the dolly has wells or recesses for receiving the wheels of a superposed dolly. The wheels of fixed castors are received to recesses which are shaped such that the wheels fit tightly, whereby there is minimal play between the dollies. The wheels of castors, on the other hand, are received to a well which is formed by a plate having nodules welded to the plate. The nodules are used for providing lateral support for the wheel such that the wheel is locked into place, thus preventing movement of the castor joint during transportation of a dolly stack.

The present systems for attaching the wheels to a dolly and for positioning the wheels of the dollies when dollies are stacked upon each other are labor intensive and expensive because of the weld nodules for locking the castor wheel, four fasteners to assemble and screw in etc.

It is therefore an aim of the present invention to provide a simplified dolly, the castor wheels of which are locked into position. A further aim of one embodiment of the invention is to provide a dolly wherein the castor wheels are attached to the dolly by a single fastener. A further aim of another embodiment of the invention is to provide a dolly wherein a single fastener functions as a attachment means for the castor wheels as well as a positioning element.

SUMMARY OF THE INVENTION

The aims of the present invention are achieved by attaching a castor wheel to a dolly by one fastener having a body penetrating the chassis of the dolly for attaching the wheel and a head having a guide portion that extends away from the body for providing means for positioning a castor wheel on the upper surface of the chassis of the dolly.

According to one embodiment of the invention, the guide portion of the head of the fastener is rotationally symmetric. According to another embodiment of the invention, the fastener is positioned on a swivel axis of the fork bracket of the castor wheel.

Considerable benefits are gained with aid of the present invention. The assembly time of the dolly is reduced since only one fastener has to be positioned and tightened. There is no need for a welding step. The appearance of the dolly is also improved since the head of the fastener provides cleaner appearance than the welded nodules. Further, the number of parts needed for the dolly is decreased, which is beneficial for manufacturing and plant logistics. The invention also provides a simple, reliable positioning and locking of superposed dollies.

BRIEF DESCRIPTION OF THE SEVERAL VIEWS OF THE DRAWINGS

In the following, exemplary embodiments of the invention are described in greater detail with reference to the accompanying drawings in which.

DETAILED DESCRIPTION OF PREFERRED EMBODIMENT

Figure 1:
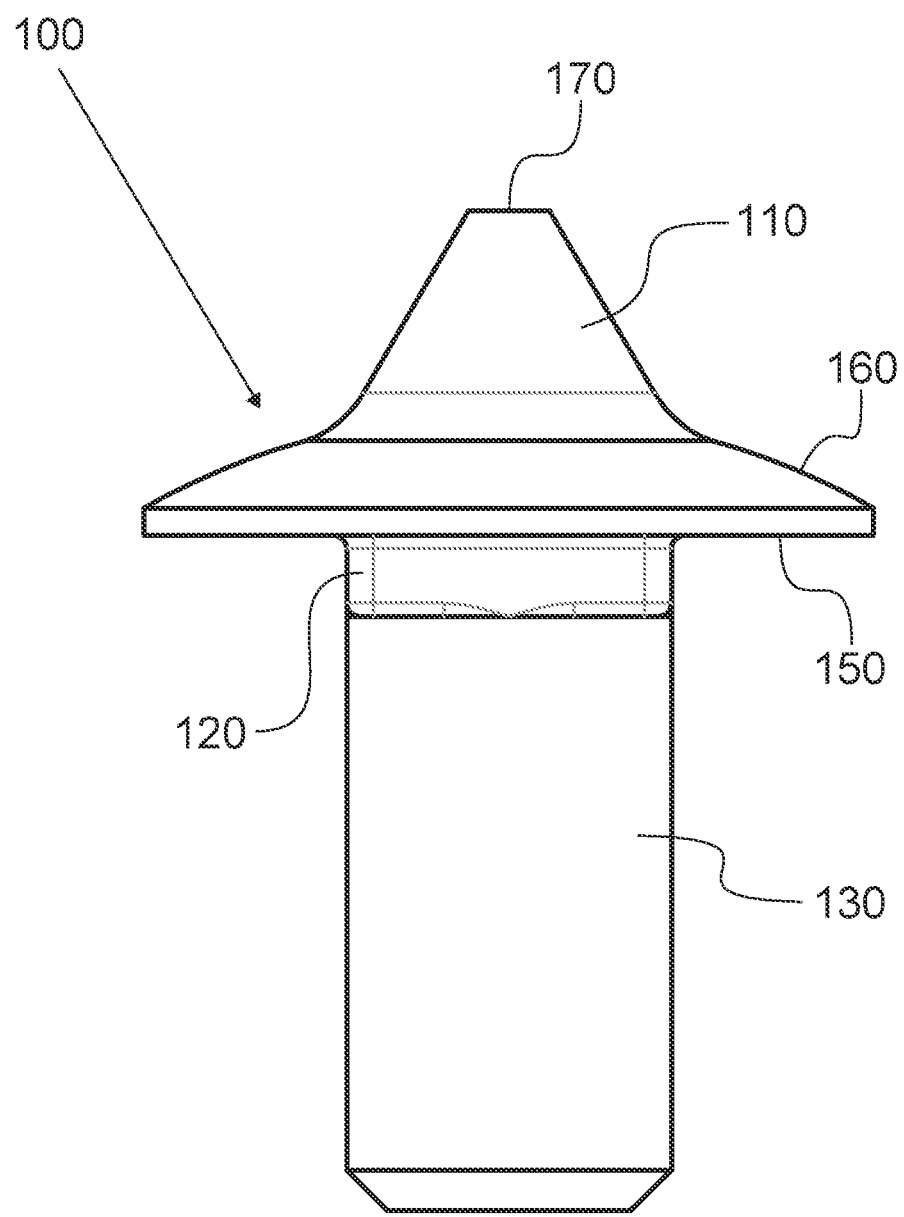
FIG. 1 presents a side elevation view of a fastener according to one embodiment.

FIG. 1 depicts an embodiment of a fastener 100 for fixing a castor to a dolly according to the invention. The fastener 100 comprises a head 110 that is formed of a circular flange 140 that has a flat surface 150 and a convex surface. In the middle of the convex surface and extending therefrom is a knob 170 that has a form of a cut cone. In the middle of the flat surface and extending therefrom is an elongated body portion 130. The body portion defines the axial direction and central axis of the fastener 100. The elongated body part is threaded and configured to connect the fork bracket 221 of a castor and the dolly. On the elongated body part 130 and directly under the flange 160 of the fastener 100 is a hexagonal shape for angular locking of the fastener. This shape is needed for preventing the rotation of the fastener during assembly and tightening. The actual shape of this part of the fastener may be any form locking shape like quadrangular, triangular, oval or any other form used in similar mechanical parts. The elongated body part may be threaded all over its length or only partly.

Figure 2:
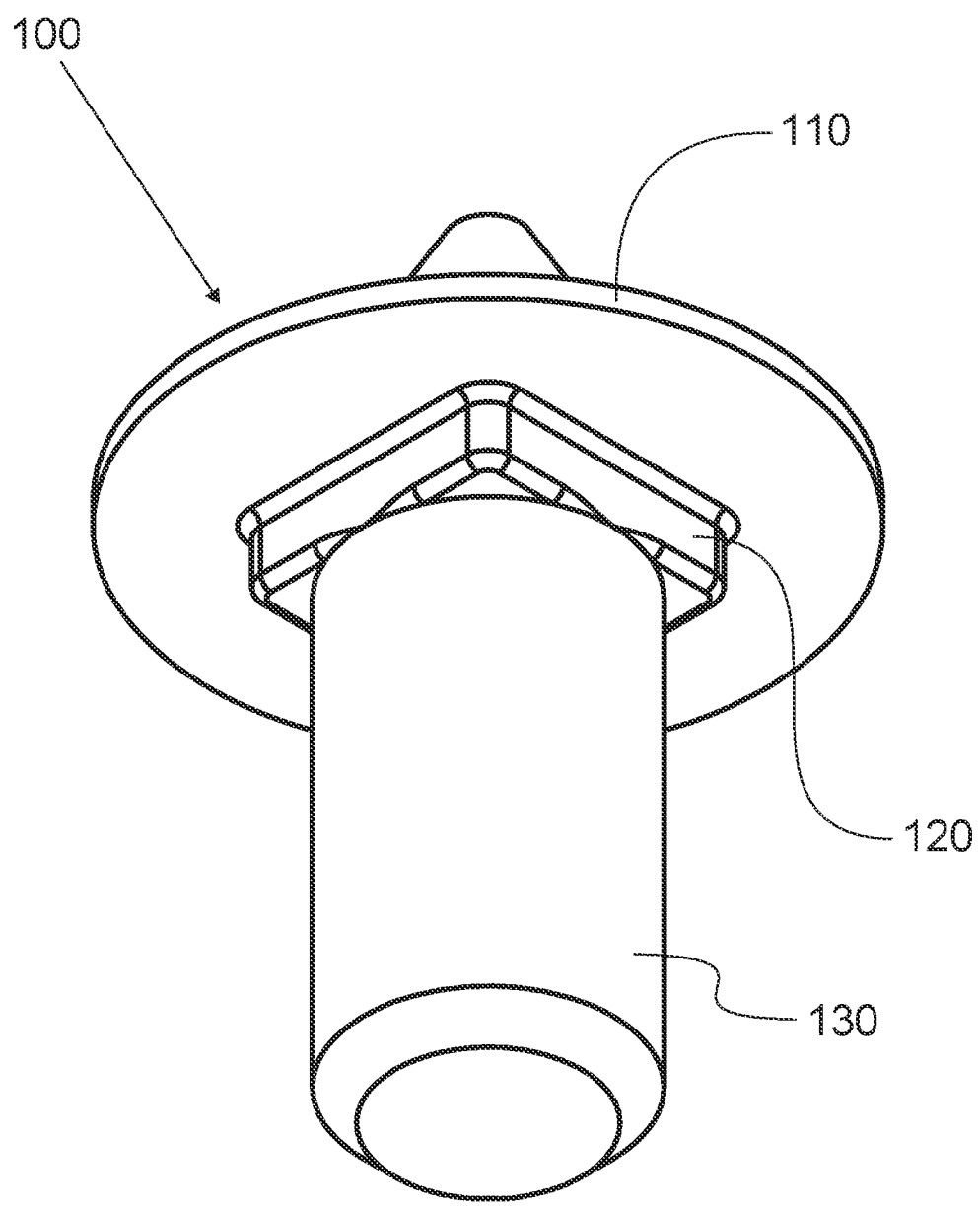
FIG. 2 presents an isometric bottom view of the fastener of FIG. 1.
Figure 3:
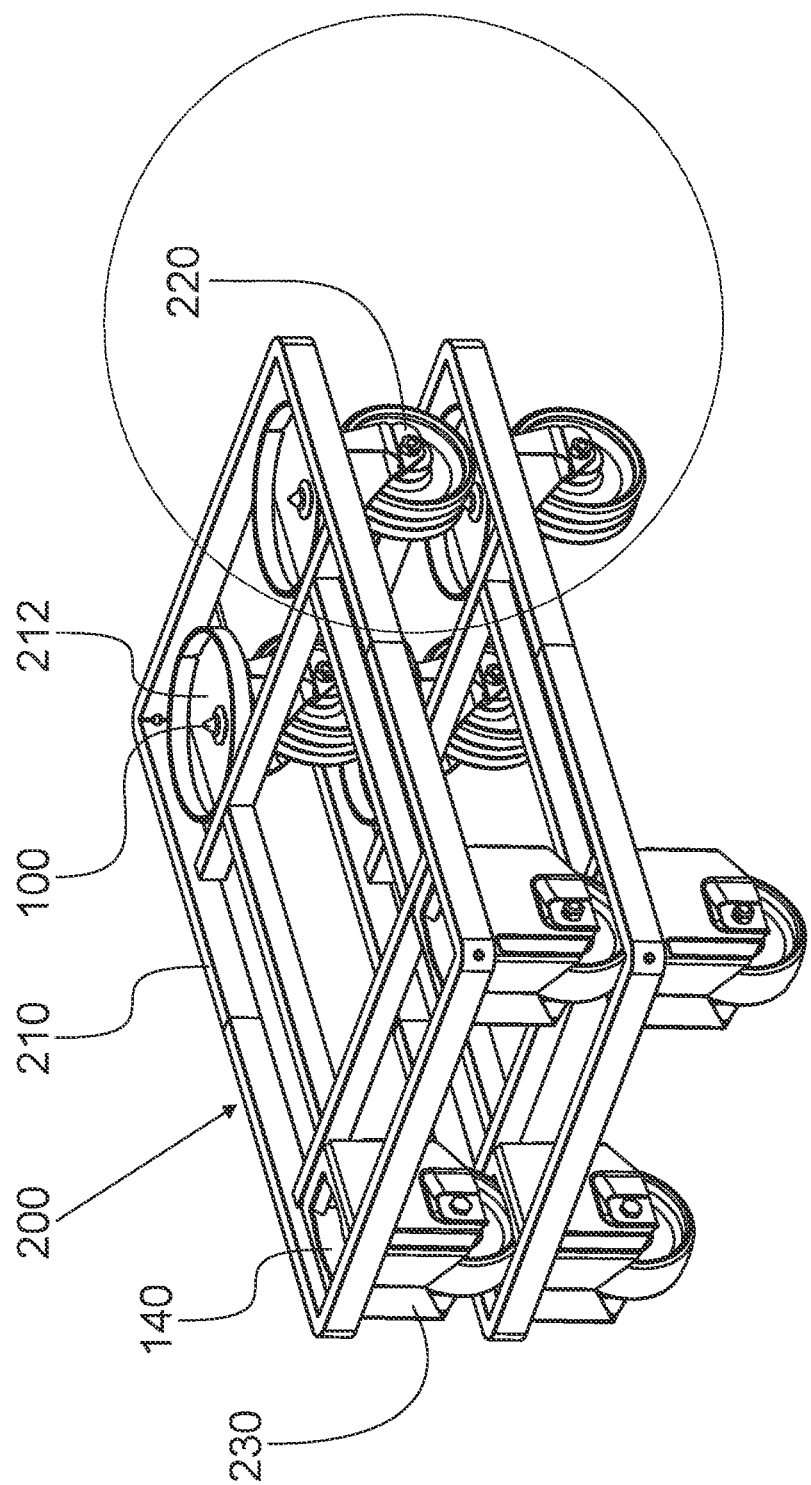
FIG. 3 presents an isometric side view of two superposed dollies having castor wheels attached to the chassis of the dolly by means of the fastener of FIG. 1.
Figure 4:
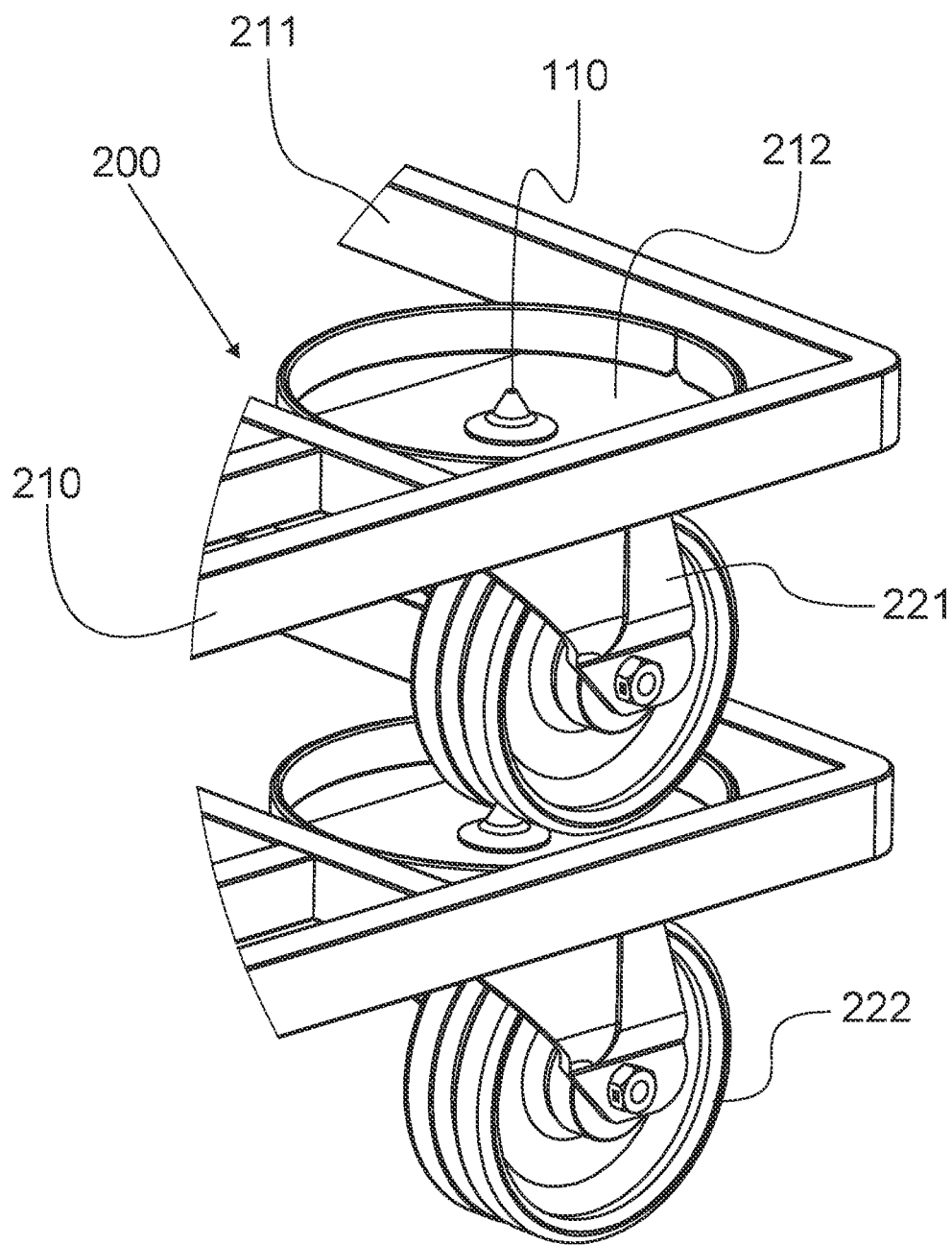
FIG. 4 presents a detail view of the cooperation between the fastener head of a lower dolly and the wheel of the upper dolly of FIG. 3.
Figure 5:
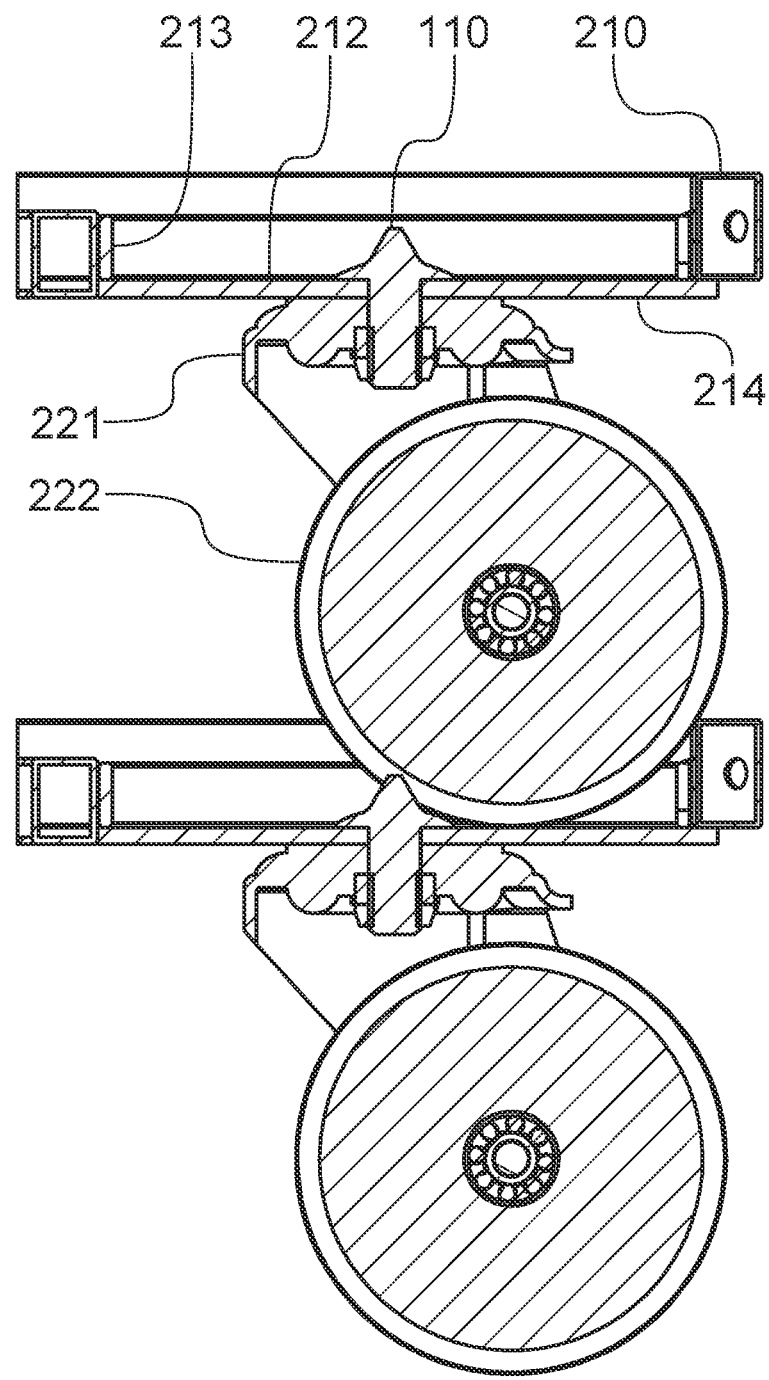
FIG. 5 presents a cross-sectional side view of FIG. 3.
Figure 6:
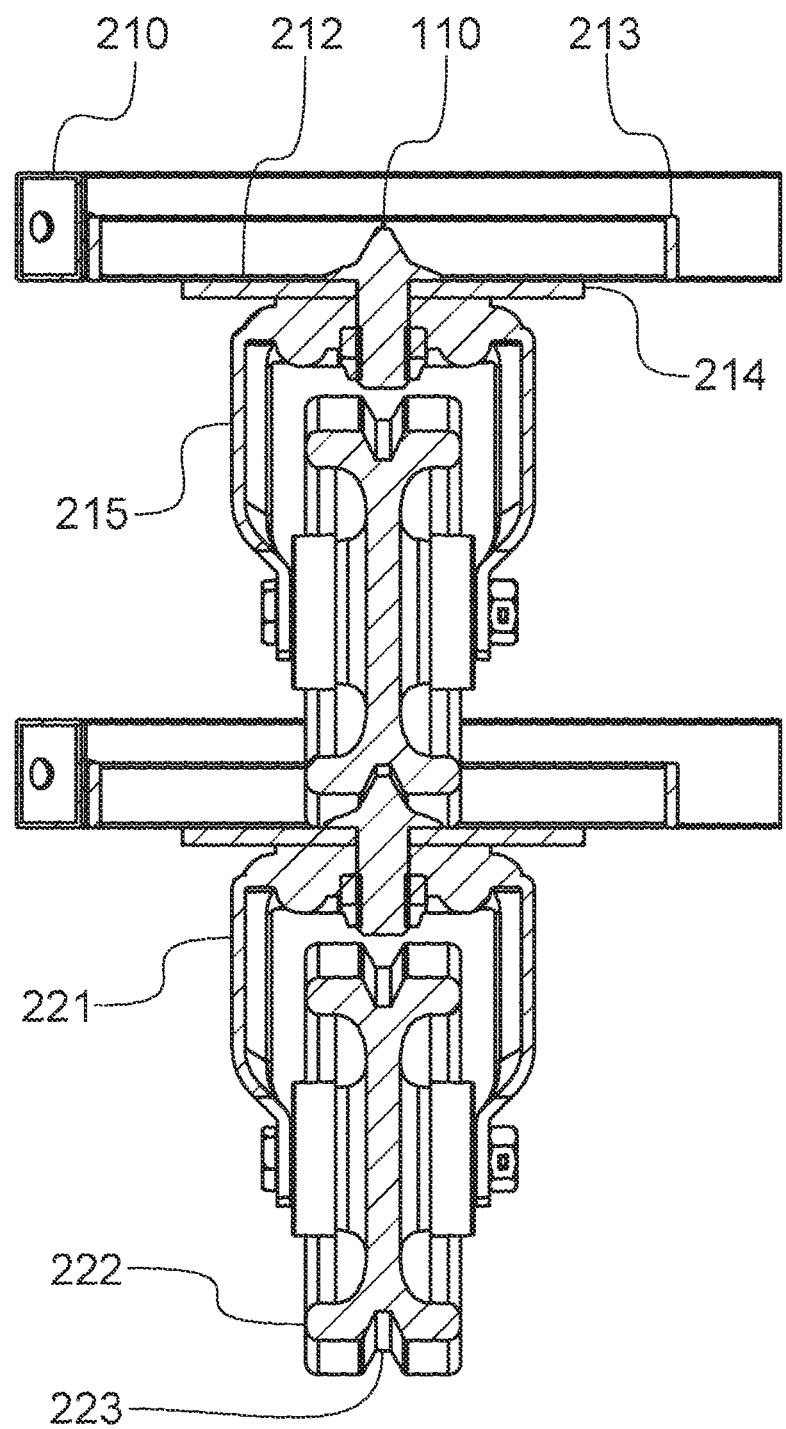
FIG. 6 presents a cross-sectional front view of FIG. 3.

One important feature of the invention is the form of the head 110. In general, the head 110 should have a cross-sectional shape which is configured to engage and support the periphery of a wheel of a castor wheel. The flanged cone 160, 170 of FIG. 1 is especially advantageous since its rotationally symmetric outer surface is able to guide a wheel in all directions around its central axis. This form is especially advantageous when dollies are equipped with castor wheel that have a central groove in their perimeter. Such wheel will be described in more detail in following. Other possible forms are a groove or a ridge that are aligned with a side of the dolly. The outer or/and inner sides of grooves or ridges may be sloped for aiding the fitting of a wheel to the shape of the head. Other forms that can be contemplated are a cylindrical pin or a fork or U-profile. The head may have a recess or outer shape complementary to a suitable tool, such as hex key or a screw driver. In such case the hexagonal shape 120 or similar is not needed. In FIG. 2 this shape 120 is shown as quadrangular.

A dolly 200 shown in FIGS. 3-6 features a rectangular chassis 210 welded together from tubes having a rectangular profile. The outer perimeter of the dolly 20 is formed of a tube that is configured to a rectangular frame 211 that has two long sides and two short sides. The dolly 200 has two fixed castors 230 and two swiveling castors 220. Fixed castors 230 are secured to the corners of the frame 211 at one end of the dolly by means of bolts, riveted joints or by welding. Each castor is typically fixed with four bolts. Fixed castors are such that the wheel of the castor is permanently aligned with one side of the dolly. At the opposite end of the dolly 200, swiveling castor wheels are provided. Due to the articulated construction, the castor wheels may turn, or swivel, about an axis which is orthogonal to the axis of revolution of the wheel, i.e. about the vertical axis.

The top face of the dolly 200 has wells 212, 140 or recesses for receiving the wheels 220 of a superposed dolly. The wheels of fixed castors 230 are received to quadrangular recesses 214 which are shaped such that the wheels fit tightly, whereby there is minimal play between the dollies. The wheels 222 of swiveling castors 220, on the other hand, are received to a well 212 which is formed by a flat bottom plate 214 and a circular ring 213. The fastener 100 is placed on the bottom plate in the center of the ring 213. The bottom plate 214 has a hole in its center and the elongated body part 130 of the fastener 100 passes through the hole. The elongated body part 130 passes also the fork bracket 221. In order to enable swiveling of the wheel 222, the wheel is attached to the fork of the fork bracket 221 by a rotatable joint, for example by a ball bearing. The hole for mounting the bracket to the dolly 200 runs through the rotation axle of the joint, whereby the wheel 222 of swiveling castor 220 can rotate around said axle. These kinds of castor wheels are readily available in market and only requirement for their use herein is an ability to use a single hole for attaching the castor wheel 220 to the dolly 200. The hole in the bottom plate 214 is shaped complementary to the quadrangular, hexagonal or other shape 120 of the fastener 100 and provides a form locking connection for preventing rotation of the fastener 100. The swiveling castor wheel 220 is attached to the dolly 200 by a nut 215 screwed on the threaded part of the fastener 100. The rotation of the body of the swiveling castor 220 in relation to the chassis 210 of the dolly 100 may be prevented either by friction between the tightly joined bodies or the chassis and body of the castor may comprise complementary forms that prevent such rotation, if necessary.

In this embodiment the head 110 of the fastener 100 is shaped like a cap of a mushroom and is rotationally symmetrical. The wheels 222 of the castors comprise a groove 223 that runs in the middle of the running surface of the wheel 222. The cone 170 of the head 110 is shaped to fit complementary in the groove 223. Now, as the head 110 is rotationally symmetrical and the wheel well 212 is surrounded by a circular ring 213, the wheel 222 of the castor 220 can be placed in any angular position between the head 110 and the ring 213 and the wheel is always positively locked between the head 110 and the ring 213. The wheel 222 may also rotate around the head 110 freely and the chassis 210 of the dolly remains always aligned with the underlying dolly regardless of the rotational position of the wheel 222. If other form of the head, such as a fork or a groove is used, the wheel must be aligned with the head 110. In that case stapling the dollies is more cumbersome. For this reason the rotationally symmetric form of the head and rotationally symmetric wall limiting the inside of the wheel well are preferable. The fastener is always positioned at the swivel axle of the swiveling castor wheel 222, which provides for naturally aligned positioning of the dollies.

Naturally, the shape of the head 110 must be adapted to the shape of the wheel that is used. As mentioned earlier, a large variation of castors are readily available in the market.

Thus, while there have been shown and described and pointed out fundamental novel features of the invention as applied to a preferred embodiment thereof, it will be understood that various omissions and substitutions and changes in the form and details of the device may be made by those skilled in the art without departing from the spirit of the invention. For example, it is expressly intended that all combinations of those elements and/or method steps which perform substantially the same results are within the scope of the invention. Substitutions of the elements from one described embodiment to another are also fully intended and contemplated. It is also to be understood that the drawings are not necessarily drawn to scale but they are merely conceptual in nature. It is the intention, therefore, to be limited only as indicated by the scope of the claims appended hereto.

We claim:

1. A dolly comprising:
   (a) a chassis;
   (b) a castor having a fork and a wheel rotatably mounted to the fork,
   (c) a fastener for fixing the fork of the castor to the chassis of the dolly and placed on a rotational axis of the fork, where the fastener comprises a head shaped to the peripheral shape of the wheel of the castor, and
   (d) at least one wheel well for receiving a wheel, the wheel well limited by a rotationally symmetrical wall, and the fastener being placed in the middle of the well, wherein the fastener is prevented from rotation around its axial direction and the wheel well comprises a bottom plate having a hole with a shape based on a structure used to event rotation of the fastener around its axial direction.

2. The dolly according to claim 1, wherein the fastener is rotationally symmetrical.

* * * * *

UNITED STATES PATENT AND TRADEMARK OFFICE
CERTIFICATE OF CORRECTION

PATENT NO. : 9,573,421 B2
APPLICATION NO. : 14/133322
DATED : February 21, 2017
INVENTOR(S) : Tiilikainen et al.

Page 1 of 1

It is certified that error appears in the above-identified patent and that said Letters Patent is hereby corrected as shown below:

In the Claims

At Column 4, Line 52:
"event rotation" should be changed to -- prevent rotation --.

Signed and Sealed this
Eleventh Day of April, 2017

Michelle K. Lee
*Director of the United States Patent and Trademark Office*